Jan. 4, 1955  H. H. KALMOE  2,698,599
MULTIPLE NEST
Filed Aug. 19, 1953  2 Sheets-Sheet 1
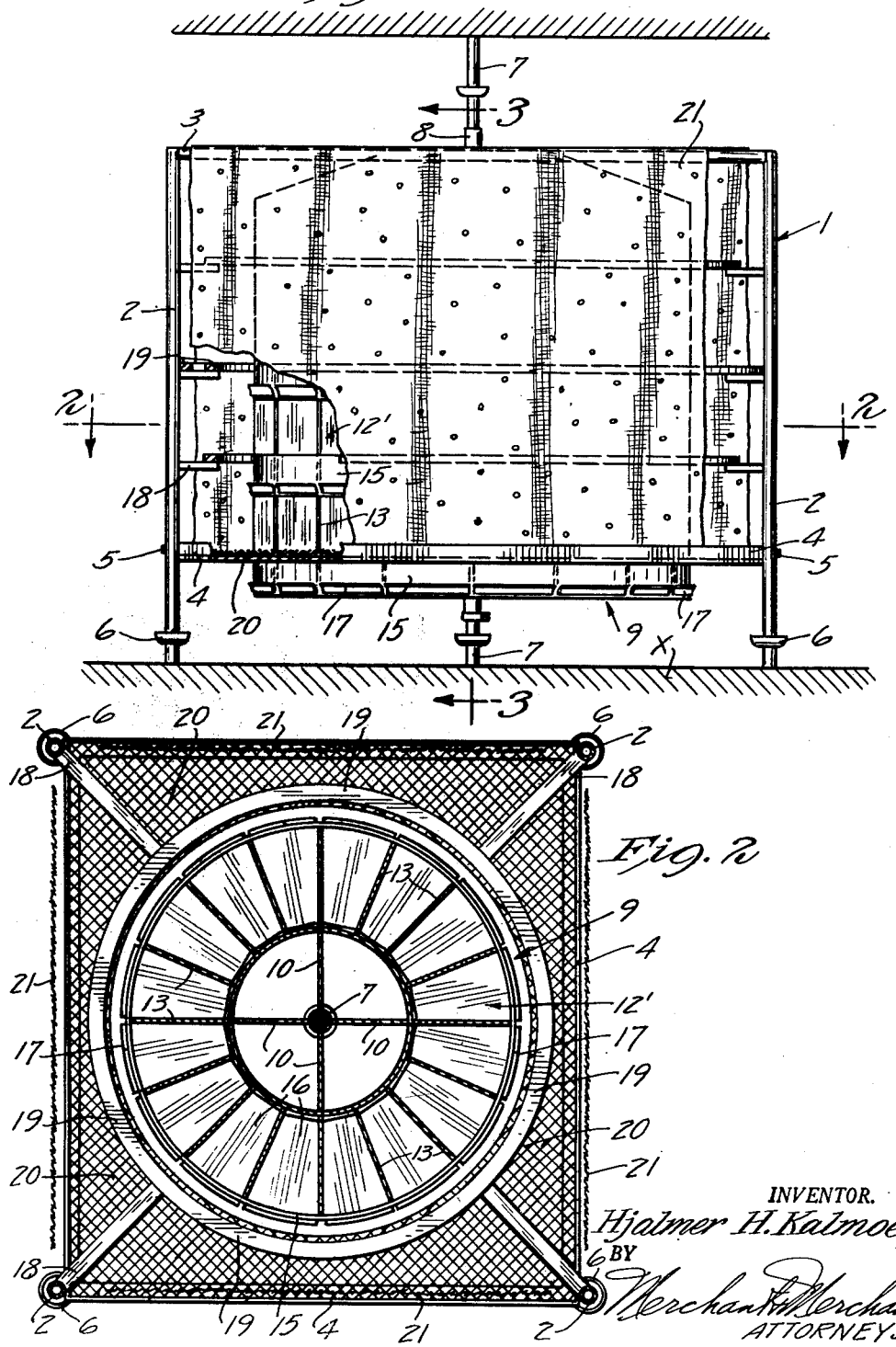
INVENTOR.
Hjalmer H. Kalmoe
BY
Merchant & Merchant
ATTORNEYS Jan. 4, 1955
H. H. KALMOE
2,698,599
MULTIPLE NEST
Filed Aug. 19, 1953
2 Sheets-Sheet 2
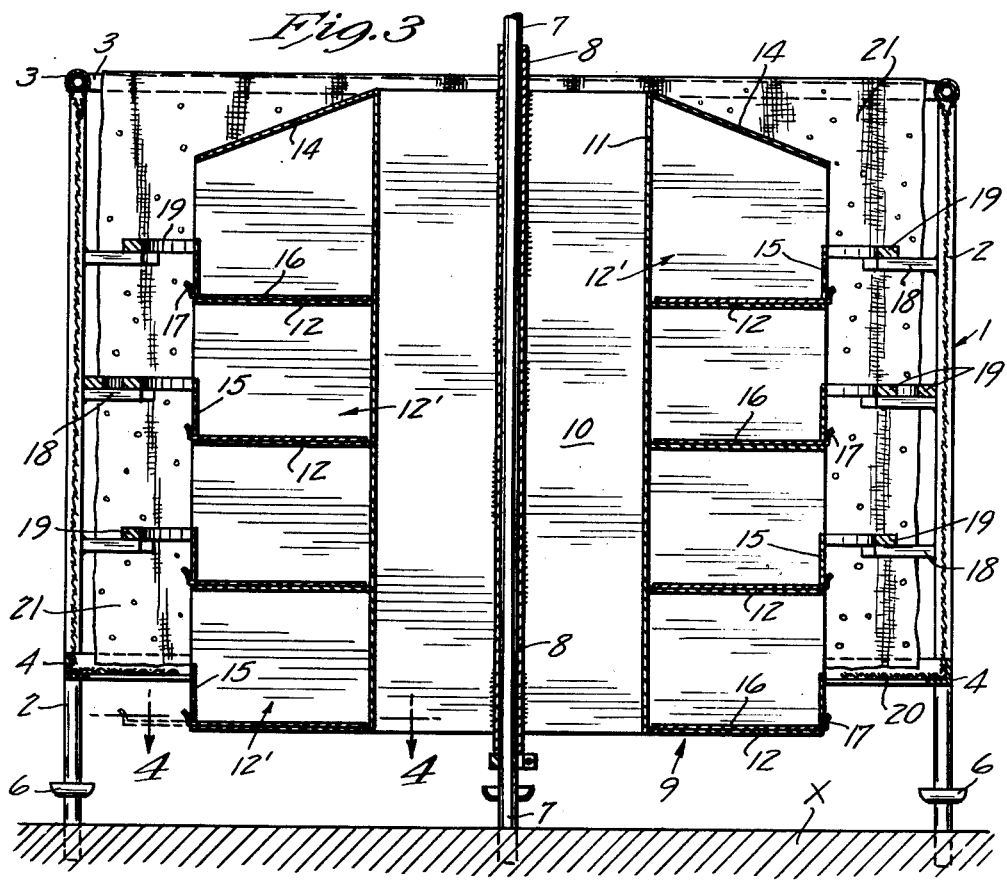
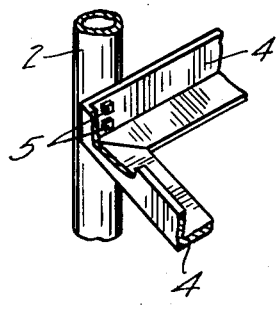
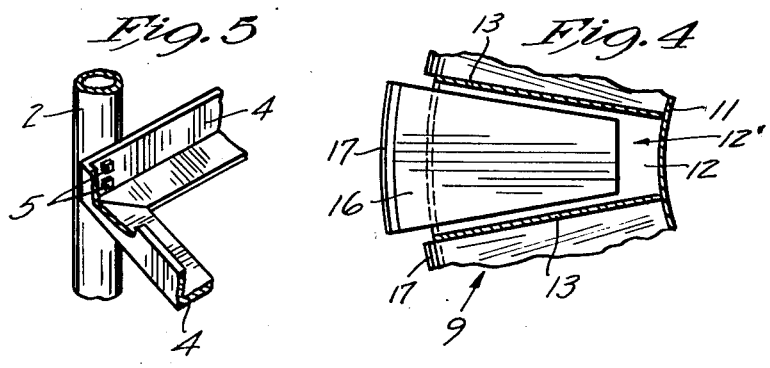
INVENTOR.
Hjalmer H. Kalmoe
BY
Merchant & Merchant
ATTORNEYS

United States Patent Office 2,698,599
Patented Jan. 4, 1955

2,698,599

MULTIPLE NEST

Hjalmer H. Kalmoe, Montevideo, Minn.

Application August 19, 1953, Serial No. 375,157

4 Claims. (Cl. 119—45)

My invention relates to the art of sanitary poultry devices and more particularly to a sanitary multiple nest structure.

The primary object of my invention is the provision of a multiple nest structure in which the eggs may be gathered with a minimum of effort and within minimum time by an operator standing in a given position. To this end, I provide a generally rectangular frame structure having curtains thereon mounted for longitudinal sliding movements, and a nest structure within said frame mounted for rotation about a vertical axis. Said nest structure has a plurality of vertically spaced tiers of radially outwardly opening segmental nest forming compartments, all of which come into close proximity with the intermediate portion of each side of the frame upon rotation of said nest structure. Therefore it is only necessary for the operator to slide the curttain on a given side of the frame to one side or the other in order that he may have access to the rotary nest structure at the closest point.

A further object of my invention is a device of the class described which is highly sanitary and easy to clean. To this end, I provide a removable false bottom for each of the segmental nest forming compartments.

A further object of my invention is the provision of a device of the class above described in which the frame is provided with continuous perch elements, said perch elements being spaced upwardly and outwardly from its cooperating tier of nest forming compartments. These perch elements thus act like a platform and permit the hens to walk completely about the circumference of the circular nest structure in order to find a suitable and vacated nest.

A still further object of my invention is the provision of a multiple nest of the class described which is inexpensive to produce, is durable in construction and is extremely easy to operate.

The above and still further objects of my invention will become apparent from the following detailed specification, appended claims, and attached drawings.

Referring to the drawings wherein like characters indicate like parts throughout the several views:

Fig. 1 is a view in side elevation, some parts being broken away and some parts shown in section;

Fig. 2 is a view in horizontal section taken on the line 2—2 of Fig. 1;

Fig. 3 is an enlarged view in vertical axial section taken substantially on the line 3—3 of Fig. 1;

Fig. 4 is an enlarged fragmentary sectional view taken on the line 4—4 of Fig. 3; and Fig. 5 is a fragmentary perspective view of the frame structure.

Referring with greater particularity to the drawings, the numeral 1 indicates in its entirety a skeletonized frame including legs 2, upper connecting members 3 and lower connecting members 4, the former being in the nature of tubular pipes while the latter preferably and as shown comprise angle irons secured to the legs 2 by means of bolts 5 or the like. The legs 2 may be suitably secured to the ground or floor $x$ and preferably and as shown are provided with annular cups 6 which are customarily filled with lice-killing fluid. The frame 1 defines a generally rectangular area, in the center of which is adapted to be mounted, preferably and as shown independently of the frame 1, a vertically disposed shaft 7. Rotatably mounted on the shaft 7 is an elongated sleeve 8 which forms the core of a generally cylindrical nest structure 9. The nest structure 9 includes radiating webs 10, an upstanding tubular member 11 which is radially spaced from but concentric with the sleeve 8 and a plurality of radially outwardly projecting annular disks 12 which are vertically spaced from each other and provide a plurality of tiers. Dividing the several tiers into a plurality of segmental nest forming compartments 12' are the vertically disposed radially extending plates 13. Members 8, 10, 11, 12 and 13 are preferably formed from sheet metal or the like and are soldered or otherwise secured together to form a rugged unitary structure.

As shown, the tubular member 11 is flared downwardly and outwardly at its upper end to provide a roof element 14 for the upper tier of nest forming compartments. Also, as shown the numerous compartments 12' open radially outwardly in the direction of the frame 1, the same being partially closed by upstanding straps 15 extending between the plates 13 and in closely spaced relation to the annular disks 12. Extending between the members 15 and the disks 12 are segmental false-bottom forming members 16 for each of the compartments 12'. Exteriorly of the straps 15 the bottom forming members 16 are bent angularly upwardly as at 17 to provide handles. The false bottoms 16 obviously may be slidably removed for the purpose of cleaning the same periodically.

Projecting inwardly from the legs 2 are vertically spaced brackets 18 upon which are mounted perch forming elements in the nature of continuous walks 19. Perch elements 19, as shown, are provided one each for each tier of nest forming compartments 12' and are substantially on the same level as the upper portions of the straps 15 and are outwardly spaced therefrom so as to allow a hen standing thereon to enter a given compartment 12' in a given tier with a minimum of ease. Also preferably and as shown, the bottom tier of compartments 12' is provided with a generally annular screen 20 in lieu of a perch element of the type 19. The screen 20 is supported by the rectangular angle iron 4. Flexible curtains 21 one for each open side of the frame 1 are slidably mounted along their upper ends on the upper connecting members 3. As shown in Fig. 1, at least one of the flexible screens 21 has a maximum width less than the distance between the legs 1 so as to assure an opening for the hens as they gain access to and leave the perch members 19. When the operator is desirous of collecting all of the eggs which may be laid in the several segmental compartments 12' of the overlying tiers, this may be done merely by sliding one of the screens 21 laterally so that said operator can approach the rotary nest structure 9 at the closest point or midway between the legs 1. Thereafter he imparts rotary movement to the nest structure 9 and collects all of the eggs from this point.

My invention has been thoroughly tested and found to be completely satisfactory for the accomplishment of the above objects and while I have disclosed a preferred embodiment thereof, it will be understood that the same is capable of modification without departure from the spirit and scope of the appended claims.

What I claim is:

1. A multiple nest structure comprising an upstanding skeletonized frame defining a generally rectangular area, a shaft adapted to be mounted in a vertical position centrally of said area, a generally cylindrical nest structure mounted on said shaft for rotation on a vertical axis in spaced relation to said frame, a plurality of circumferentially spaced segmental nest forming compartments in said nest structure, a continuous perch element extending around the interior of said frame in spaced relation to said rotary nest structure, and flexible curtains carried by said frame outwardly of said perch element.

2. The structure defined in claim 1 in which said perch element is upwardly spaced with respect to the bottoms of said nest forming compartments and in which said curtains are horizontally slidable with respect to said frame.

3. A multiple nest structure comprising an upstanding skeletonized frame including supporting legs and upper and lower connecting members and defining a generally rectangular area, a shaft adapted to be mounted in a vertical position centrally of said area and independently of said frame, a generally cylindrical nest structure mounted on said shaft for rotation on a vertical axis in spaced relation to said frame, said nest structure including a plurality of tiers of circumferentially spaced segmental nest forming compartments, a continuous perch element for each tier extending around the interior of said frame, and flexible curtains for the sides of said frame, said curtains being slidably mounted on the upper connecting members of said frame, at least one of said curtains being of sufficiently less width than said frame to provide access for the hens to said perches even when said curtain is in a spread condition.

4. The structure defined in claim 3 in which the nest forming compartments are provided with removable segmental false bottoms.

References Cited in the file of this patent

UNITED STATES PATENTS

| Number | Name | Date |
|---|---|---|
| 406,248 | Williams | July 2, 1889 |
| 1,162,386 | Nellen | Nov. 30, 1915 |
| 1,504,721 | Sauve et al. | Aug. 12, 1924 |
| 1,921,352 | Ferguson | Aug. 8, 1933 |
| 2,191,651 | Haesloop | Feb. 27, 1940 |
| 2,257,734 | Cornell | Oct. 7, 1941 |
| 2,608,178 | Kolber | Aug. 26, 1952 |